United States Patent
Porzio Giusto (10) Patent No.: US 9,961,406 B2
(45) Date of Patent: May 1, 2018

(54) METHOD FOR RE-DETERMINING THE NUMBERING OF RADIO-TELEVISION PROGRAMS, AND APPARATUS THEREOF

(71) Applicant: SISVEL TECHNOLOGY S.R.L., None (TO) (IT)

(72) Inventor: Pietro Porzio Giusto, Rome (IT)

(73) Assignee: Sisvel Technology S.R.L., None (TO) (IT)

( * ) Notice: Subject to any disclaimer, the term of this patent is extended or adjusted under 35 U.S.C. 154(b) by 0 days. days.

(21) Appl. No.: 15/112,987

(22) PCT Filed: Jan. 19, 2015

(86) PCT No.: PCT/IB2015/050390
§ 371 (c)(1),
(2) Date: Jul. 20, 2016

(87) PCT Pub. No.: WO2015/110947
PCT Pub. Date: Jul. 30, 2015

(65) Prior Publication Data
US 2016/0353178 A1    Dec. 1, 2016

(30) Foreign Application Priority Data
Jan. 27, 2014    (IT) .............................. TO2014A0057

(51) Int. Cl.
*H04N 5/445* (2011.01)
*G06F 3/00* (2006.01)
(Continued)

(52) U.S. Cl.
CPC ... *H04N 21/4823* (2013.01); *G06F 17/30817* (2013.01); *H04H 60/44* (2013.01);
(Continued)

(58) Field of Classification Search
None
See application file for complete search history.

(56) References Cited

U.S. PATENT DOCUMENTS 8,938,760 B1 * 1/2015 Yang .................. H04N 21/4823
348/553
2009/0106799 A1 * 4/2009 Park ........................ H04N 5/44
725/56
(Continued)

FOREIGN PATENT DOCUMENTS

EP    1 753 234 A2    2/2007
EP    2 028 847 A2    2/2009
(Continued)

OTHER PUBLICATIONS

International Search Report dated Mar. 17, 2015, issued in PCT Application No. PCT/IB2015/050390, filed Jan. 19, 2015.
(Continued)

*Primary Examiner* — Fred Peng
(74) *Attorney, Agent, or Firm* — Workman Nydegger (57) ABSTRACT

A method is described for re-determining, in a television apparatus, a program table including associations between alphanumeric labels and radio-television programs, each one of the alphanumeric labels indicating a string of characters that must be selected by the user in order to activate the reproduction of one of the radio-television programs associated therewith, the method including the steps of biunivocally associating with each radio-television program in the table an alphanumeric label comprising a numeric part; allowing at least a first list and a second list to be simultaneously displayed on a screen, both including identification data of the radio-television programs obtained from the program table, the radio-television programs being sorted in the lists according to sorting criteria; selecting a first program from the first list of programs sorted according to a first
(Continued)

sorting criterion, the first program being associated with a first alphanumeric label; selecting a second program from the second list of programs sorted according to a second sorting criterion, the second program being associated with a second alphanumeric label; and modifying the value of the first alphanumeric label of the first program with an alphanumeric label value comprised in the range delimited by the value of the second alphanumeric label, extreme included, and by the value of the alphanumeric label, extreme excluded, which immediately precedes the second alphanumeric label in the second list.

21 Claims, 9 Drawing Sheets (51) Int. Cl.
G06F 13/00 (2006.01)
H04N 21/482 (2011.01)
H04N 21/485 (2011.01)
H04N 21/434 (2011.01)
H04H 60/44 (2008.01)
G06F 17/30 (2006.01)

(52) U.S. Cl.
CPC ....... *H04N 21/4345* (2013.01); *H04N 21/485* (2013.01); *H04N 21/4821* (2013.01)

(56) References Cited

U.S. PATENT DOCUMENTS

2010/0267370 A1* 10/2010 Lee .................. H04N 5/445 455/414.1
2010/0333141 A1* 12/2010 Kang ................ H04N 5/4401 725/44
2013/0174193 A1 7/2013 Yu et al.

FOREIGN PATENT DOCUMENTS

| KR | 10-2009-0105343 | 10/2009 |
| WO | 2006/085165 A1 | 8/2006 |
| WO | 2011/077341 A1 | 6/2011 |
| WO | 2013/049089 A1 | 4/2013 |

OTHER PUBLICATIONS

Humaz iCord HD User's Manual, Jan. 1, 2008, pp. 1-20, XP055078116.

* cited by examiner

Fig. 1

| Alphanum. label | Prog. name | Prog. No. | PID | Freq. |
|---|---|---|---|---|
| a1 | n.A | 1 | p.A | f.A |
| a2 | n.E | 7 | p.E | f.E |
| a3 | n.F | 8 | p.F | f.F |
| a4 | n.C | 3 | p.C | f.C |
| a7 | n.J | 2 | p.J | f.J |
| a8 | n.B | 4 | p.B | f.B |
| a9 | n.G | 9 | p.G | f.G |
| a10 | n.I | 12 | p.I | f.I |
| a11 | n.D | 13 | p.D | f.D |
| a12 | n.H | 10 | p.H | f.H |
| a14 | n.L | 15 | p.L | f.L |
| a15 | n.P | 19 | p.P | f.P |
| a16 | n.N | 17 | p.N | f.N |
| a17 | n.O | 18 | p.O | f.O |
| a18 | n.M | 16 | p.M | f.M |
| a20 | n.U | 24 | p.U | f.U |
| a21 | n.W | 26 | p.W | f.W |
| a22 | n.V | 25 | p.V | f.V |
| a23 | n.T | 23 | p.T | f.T |
| a24 | n.S | 22 | p.S | f.S |
| a25 | n.Q | 20 | p.Q | f.Q |
| a26 | n.R | 21 | p.R | f.R |

Fig. 2

| Sorting by label | | Sorting by name | |
|---|---|---|---|
| Label | Name | Label | Name |
| a26 | n.R | a20 | n.U |
| a1 | n.A | a22 | n.V |
| a2 | n.E | a21 | n.W |
| a3 | n.F | a1 | n.A |
| a4 | n.C | a8 | n.B |
| a7 | n.J | a4 | n.C |
| a8 | n.B | a11 | n.D |
| a9 | n.G | a2 | n.E |
| a10 | n.I | a3 | n.F |
| a11 | n.D | a9 | n.G |
| a12 | n.H | a12 | n.H |
| a14 | n.L | a10 | n.I |
| a15 | n.P | a7 | n.J |

Fig. 3

| | 21 | 22 | 23 | 24 | 25 |
|---|---|---|---|---|---|
| 20 | Alphanum. label | Prog. name | Prog. No. | PID | Freq. |
| | a1 | n.A | 1 | p.A | f.A |
| | a2 | n.E | 7 | p.E | f.E |
| | a3 | n.F | 8 | p.F | f.F |
| | a4 | n.C | 3 | p.C | f.C |
| | a7 | n.J | 2 | p.J | f.J |
| 27 | a8 | n.D | 13 | p.D | f.D |
| | a9 | n.G | 9 | p.G | f.G |
| | a10 | n.I | 12 | p.I | f.I |
| 26 | a11 | n.B | 4 | p.B | f.B |
| | a12 | n.H | 10 | p.H | f.H |
| | a14 | n.L | 15 | p.L | f.L |
| | a15 | n.P | 19 | p.P | f.P |
| | a16 | n.N | 17 | p.N | f.N |
| | a17 | n.O | 18 | p.O | f.O |
| | a18 | n.M | 16 | p.M | f.M |
| | a20 | n.U | 24 | p.U | f.U |
| | a21 | n.W | 26 | p.W | f.W |
| | a22 | n.V | 25 | p.V | f.V |
| | a23 | n.T | 23 | p.T | f.T |
| | a24 | n.S | 22 | p.S | f.S |
| | a25 | n.Q | 20 | p.Q | f.Q |
| | a26 | n.R | 21 | p.R | f.R |

Fig. 4

| Alphanum. label | Prog. name | Prog. No. | PID | Freq. |
|---|---|---|---|---|
| a1 | n.A | 1 | p.A | f.A |
| a2 | n.E | 7 | p.E | f.E |
| a3 | n.F | 8 | p.F | f.F |
| a4 | n.C | 3 | p.C | f.C |
| a7 | n.J | 2 | p.J | f.J |
| a8 | n.D | 13 | p.D | f.D |
| a9 | n.B | 4 | p.B | f.B |
| a10 | n.G | 9 | p.G | f.G |
| a11 | n.I | 12 | p.I | f.I |
| a13 | n.H | 10 | p.H | f.H |
| a15 | n.L | 15 | p.L | f.L |
| a16 | n.P | 19 | p.P | f.P |
| a17 | n.N | 17 | p.N | f.N |
| a18 | n.O | 18 | p.O | f.O |
| a19 | n.M | 16 | p.M | f.M |
| a21 | n.U | 24 | p.U | f.U |
| a22 | n.W | 26 | p.W | f.W |
| a23 | n.V | 25 | p.V | f.V |
| a24 | n.T | 23 | p.T | f.T |
| a25 | n.S | 22 | p.S | f.S |
| a26 | n.Q | 20 | p.Q | f.Q |
| a27 | n.R | 21 | p.R | f.R |

| Alphanum. label | Prog. name | Prog. No. | PID | Freq. |
|---|---|---|---|---|
| a1 | n.A | 1 | p.A | f.A |
| a2 | n.E | 7 | p.E | f.E |
| a3 | n.F | 8 | p.F | f.F |
| a4 | n.C | 3 | p.C | f.C |
| a7 | n.J | 2 | p.J | f.J |
| a8 | n.D | 13 | p.D | f.D |
| a9 | n.B | 4 | p.B | f.B |
| a10 | n.G | 9 | p.G | f.G |
| a11 | n.I | 12 | p.I | f.I |
| a12 | n.H | 10 | p.H | f.H |
| a14 | n.L | 15 | p.L | f.L |
| a15 | n.P | 19 | p.P | f.P |
| a16 | n.N | 17 | p.N | f.N |
| a17 | n.O | 18 | p.O | f.O |
| a18 | n.M | 16 | p.M | f.M |
| a20 | n.U | 24 | p.U | f.U |
| a21 | n.W | 26 | p.W | f.W |
| a22 | n.V | 25 | p.V | f.V |
| a23 | n.T | 23 | p.T | f.T |
| a24 | n.S | 22 | p.S | f.S |
| a25 | n.Q | 20 | p.Q | f.Q |
| a26 | n.R | 21 | p.R | f.R |

Fig. 6

| Alphanum. label | Prog. name | Prog. No. | PID | Freq. |
|---|---|---|---|---|
| a1 | n.A | 1 | p.A | f.A |
| a2 | n.E | 7 | p.E | f.E |
| a3 | n.F | 8 | p.F | f.F |
| a4 | n.C | 3 | p.C | f.C |
| a6 | n.J | 2 | p.J | f.J |
| a7 | n.D | 13 | p.D | f.D |
| a8 | n.B | 4 | p.B | f.B |
| a9 | n.G | 9 | p.G | f.G |
| a10 | n.I | 12 | p.I | f.I |
| a12 | n.H | 10 | p.H | f.H |
| a14 | n.L | 15 | p.L | f.L |
| a15 | n.P | 19 | p.P | f.P |
| a16 | n.N | 17 | p.N | f.N |
| a17 | n.O | 18 | p.O | f.O |
| a18 | n.M | 16 | p.M | f.M |
| a20 | n.U | 24 | p.U | f.U |
| a21 | n.W | 26 | p.W | f.W |
| a22 | n.V | 25 | p.V | f.V |
| a23 | n.T | 23 | p.T | f.T |
| a24 | n.S | 22 | p.S | f.S |
| a25 | n.Q | 20 | p.Q | f.Q |
| a26 | n.R | 21 | p.R | f.R |

Fig. 7

| Alphanum. label | Prog. name | Prog. No. | PID | Freq. |
|---|---|---|---|---|
| a1 | n.A | 1 | p.A | f.A |
| a2 | n.E | 7 | p.E | f.E |
| a3 | n.F | 8 | p.F | f.F |
| a4 | n.C | 3 | p.C | f.C |
| a6 | n.D | 13 | p.D | f.D |
| a7 | n.J | 2 | p.J | f.J |
| a8 | n.B | 4 | p.B | f.B |
| a9 | n.G | 9 | p.G | f.G |
| a10 | n.I | 12 | p.I | f.I |
| a12 | n.H | 10 | p.H | f.H |
| a14 | n.L | 15 | p.L | f.L |
| a15 | n.P | 19 | p.P | f.P |
| a16 | n.N | 17 | p.N | f.N |
| a17 | n.O | 18 | p.O | f.O |
| a18 | n.M | 16 | p.M | f.M |
| a20 | n.U | 24 | p.U | f.U |
| a21 | n.W | 26 | p.W | f.W |
| a22 | n.V | 25 | p.V | f.V |
| a23 | n.T | 23 | p.T | f.T |
| a24 | n.S | 22 | p.S | f.S |
| a25 | n.Q | 20 | p.Q | f.Q |
| a26 | n.R | 21 | p.R | f.R |

METHOD FOR RE-DETERMINING THE NUMBERING OF RADIO-TELEVISION PROGRAMS, AND APPARATUS THEREOF

BACKGROUND OF THE INVENTION

1. Field of the Invention

The present invention relates to a method for re-determining the numbering of radio-television services, commonly referred to as programs.

2. Present State of the Art

It is known that modern television apparatuses can manage the numbering of programs. For example, the LCN ("Logical Channel Numbering") logic is a function included in some television apparatuses (television sets, set-top boxes, video recorders, etc.) that allows automatically assigning to each radio-television service or program received a predefined position in the table where programs are collected, commonly referred to as program table or list, or channel table or list. This program table is generally stored in the television apparatus in a non-volatile manner, i.e., it is preserved when the apparatus is turned off. The predefined position consists of a number, generally called program number, that can be recalled by the user through the remote control. Also, when pressing the P+ and P− keys normally available on the remote control, one can display the radio-television program having a program number immediately following or preceding the one of the program currently being displayed.

The program table contains an association between the program number and the radio-television program identified by a name, typically consisting of an alphanumeric string contained in the radio-television signal received, or anyway obtainable therefrom through known methods, which is entered by the broadcaster of the radio-television program.

The association of the program number with the radio-television program, or with the content of the program table, can generally be modified at will by the user after the automatic programming. In fact, the outcome of the automatic program numbering function is very useful when installing the apparatus, but it often does not fully matches the user's preferences. In addition, the number of broadcast programs has progressively grown higher, and it has become necessary to conceive methods for changing the numbering thereof in order to meet different users' needs.

Such methods allow sorting the program numbers in a different way, i.e., assigning to a program a program number which is different from the one previously set, and hence determining a different order of visualization when the program number up key (P+) or down key (P−) are pressed. One of these methods known in the art envisages displaying a program list on a menu screen of a television set, selecting one program, the number of which needs to be changed, and directly setting a new number to be assigned to the program, e.g., through the numeric keypad of the remote control. During this process, a user must know a priori the number to be assigned to the program and, if that number has already been assigned to a second program, he/she will not be able to establish the name of said second program, unless he/she has checked beforehand.

Similarly, other methods require displaying a program list on a first menu screen of a television set, selecting a program, the number of which needs to be changed, and then displaying a second screen, superimposed on the first screen, which shows the same program list as the first screen with the addition of a "box" where a user can enter a number to be assigned to the program. In this case, if the user sets a number into the "box", the program list of the second screen will be updated, highlighting the number, and possibly also the program, selected by the user. If the number selected by the user has already been assigned to another program, and the user confirms the new numbering, the menu will show a third screen warning the user that an exchange of numbers is about to be made between the program selected by the user and the one corresponding to the assignment number.

In substance, this procedure requires identifying or deciding the point, in the list of numerically sorted programs, where a program of interest must be placed. Subsequently the user will also be allowed to search for the program of interest in the same numerically sorted list, and then assign thereto the desired serial number.

For a user, however, searching the same numerically sorted list for a program of interest is a tedious and time-consuming task, because he/she normally does not know in which one of the many positions available (in digital terrestrial and satellite television there are approximately 300-500 programs on average) that specific program is located.

Moreover, the criterion according to which these programs are sorted (typically the LCN transmitted by the radio-television broadcaster) is not always the one that the user would like to use on his/her television apparatus. If, for example, the user wants to re-sort the program table by radio-television broadcaster (RAI, Mediaset, TIMB, etc.), he/she will find it very hard to do so, because the broadcasters' various programs are positioned in a scattered and fragmentary manner, so that he/she will have to browse the table manually to find first all the programs belonging to the first broadcaster, then those of the second one, and so on. For example, while the RAI 1, RAI 2 and RAI 3 programs are normally assigned the program numbers 1, 2 and 3, in accordance with their LCNs, RAI 4 is program 21, RAI GULP is program 42, and RAI NEWS 24 is program 48. Also, while performing this operation the user cannot even exploit in some way the fact that at least all RAI programs have their names beginning with "RAI". The same difficulty is encountered when the user wants to re-sort the programs according to other criteria, such as the alphabetical order of the names of the radio-television programs, the broadcast language, encrypted or high-definition broadcasts, and so on.

Further methods envisage exchanging a first program row in a numerically sorted list with a second row by physically moving the first row displayed on the screen. This technique is also referred to as "drag and drop". This method compels the user to move the first row by performing an actual dragging operation, which becomes more and more complex and time-consuming as the numeric difference between the initial program and the assignment program increases. This problem derives from the fact that the list only shows a part of the total number of programs, and, for example, if a user wants to exchange program 5 with program 256, he/she will have to drag the row of program 5 until the row of program 256 appears on the screen, by browsing through all intermediate programs. It is clear that such an operation for changing the program numbering is not easy at all.

SUMMARY OF THE INVENTION

It is one object of the present invention to provide a method and an apparatus for re-determining the numbering of radio-television programs, which allow a user to set the program numbering in an easy and simple manner.

This and other objects of the invention are achieved by a method and an apparatus for re-determining the numbering of radio-television programs as claimed in the appended claims, which are intended to be an integral part of the present description.

In brief, the following will describe a method and an apparatus for re-determining the numbering of radio-television programs, wherein the display of the sorting and numbering of the radio-television programs on the screen of a television apparatus comprises at least two lists showing columns of elements associated with the programs, identified by means of names thereof, in particular, in at least one list, the column of the alphanumeric labels according on which the programs are sorted in an order preferred by the user, and the column of the program names. More in detail, the method provides for selecting, from a first list of programs sorted according to a first sorting criterion, through a first command issued by a user, a first program with which a first alphanumeric label is associated; selecting from a second list of programs sorted according to a second sorting criterion, through a second command issued by the user, a second program with which a second alphanumeric label is associated; modifying, through a third command issued by the user, said first alphanumeric label associated with the first program with an alphanumeric label comprised in the range delimited by said second alphanumeric label, extreme included, and by a third alphanumeric label, extreme excluded, which is the one that, in that second list, immediately precedes said second alphanumeric label.

BRIEF DESCRIPTION OF THE DRAWINGS

The above objects will become more apparent from the following detailed description of a method and an apparatus for re-determining the numbering of radio-television programs according to the present invention, with particular reference to the annexed drawings, wherein.

DETAILED DESCRIPTION OF THE PREFERRED EMBODIMENTS

Figure 1:
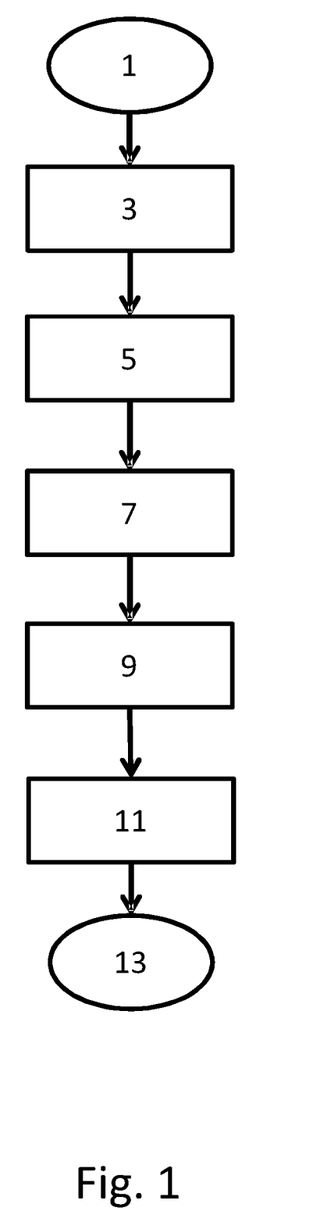
FIG. 1 shows an example of a flow chart of the method according to the present invention.

With reference to FIG. 1, there is shown an example of a flow chart of the method according to the present invention. The method starts at step 1, and then, assuming that radio-television programs have been collected into a table prearranged for biunivocally associating an alphanumeric label with each radio-television program, it provides for:

(step 3) entering a mode for modifying said alphanumeric labels, in particular by means of a command issued by the user;

(step 5) allowing at least a first list and a second list to be simultaneously displayed on a screen, both comprising elements identifying radio-television programs;

(step 7) selecting, in particular by means of a first command issued by a user, a first program from said first list of programs sorted according to a first sorting criterion, said first program being associated with a first alphanumeric label;

(step 9) selecting, in particular by means of a second command issued by a user, a second program from said second list of programs sorted according to a second sorting criterion, said second program being associated with a second alphanumeric label;

(step 11) modifying, in particular by means of a third command issued by said user, said first alphanumeric label associated with said first program with an alphanumeric label comprised in the range delimited by said second alphanumeric label, extreme included, and by the alphanumeric label, extreme excluded, that immediately precedes said second alphanumeric label in said second list.

The method ends at step 13.

It is also worth specifying that the first sorting criterion and the second sorting criterion may be either the same or different, when displaying the first and second lists.

The following will explain, by means of an example, the sorting method according to the present invention.

Figure 2:
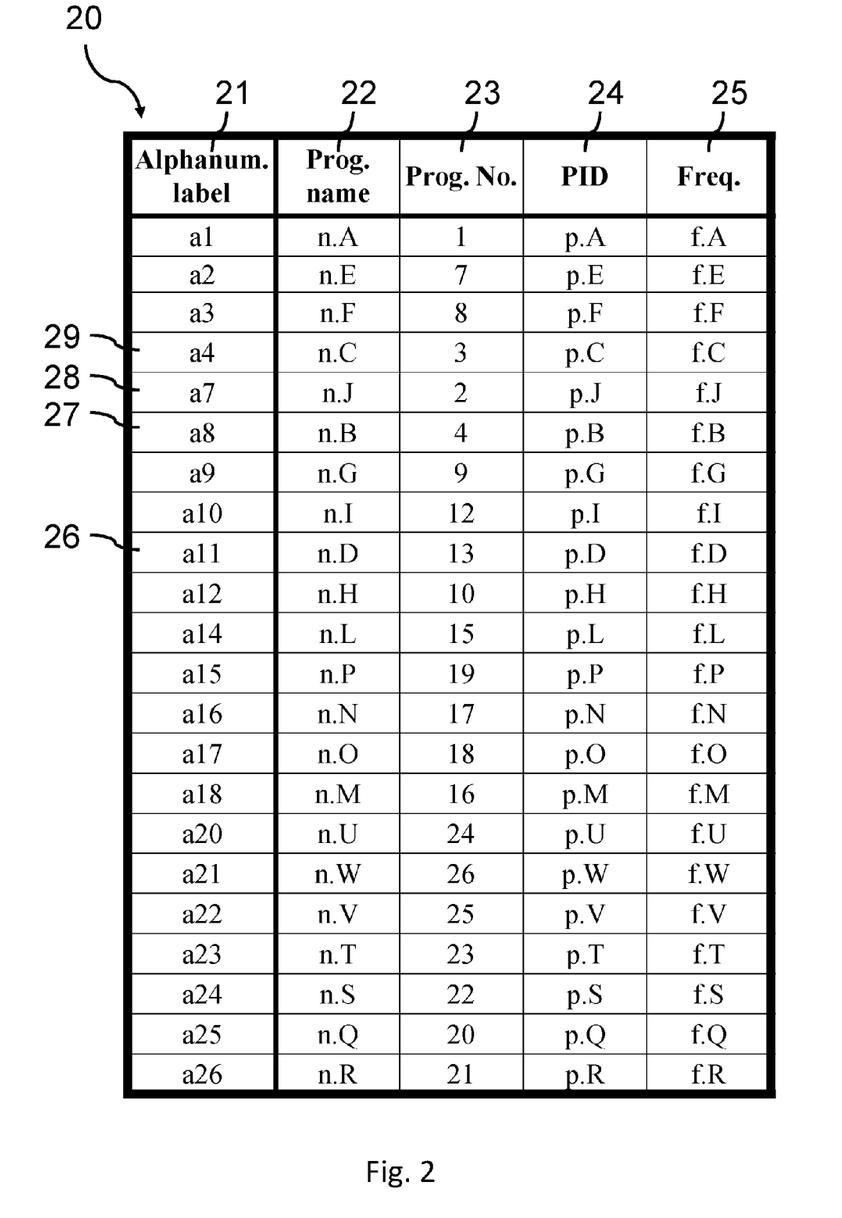
FIG. 2 shows a simplified example of a program table.

With reference to FIG. 2, the structure of a program table 20 in accordance with the present invention will now be described. The table 20 of FIG. 2 is, in fact, a simplified example of a program table, wherein each row concerns a given program, and each column contains an element type that may take different values in the different rows, i.e., for the different programs in the table.

The first column 21 of the program table 20 lists the alphanumeric labels 26,27,28,29, which allow recalling the corresponding programs for display. The values of these labels 26,27,28,29 are biunivocally associated with the programs in the table 20. Such values generally consist of alphanumeric strings, a part of which is a number, preferably a natural number, which, as will be explained below, allows incrementing or decrementing the serial position taken by the programs in the program table 20. The other components of the alphanumeric string can be used for classifying the programs based on their contents "Sports", "Films", "Cartoons", "News"), the language used, the country of origin, the quality of reception, the encryption, the definition of the images (standard, high definition, etc.), the video coding (MPEG-2, MPEG-4 AVC or HEVC), the type of broadcasting network (digital terrestrial, digital satellite, analog channels), and other characteristics. This would allow grouping the programs in the general program table according to a customized, flexible and easy-to-use numbering. For simplicity, the alphanumeric labels 26,27,28,29 of column 21 in the program table 20 consist of only one letter and one natural number, but it will be apparent to the man skilled in the art that they could be provided in a wide variety of forms without departing from the present invention.

The other columns 22,23,24,25 of the program table 20 contain data which are characteristic of the different programs. Such data are mainly obtained from the signals that carry the programs themselves, but they may also be retrieved from other sources, such as, for example, the Internet, packet connections to specialized servers, and other means of communication.

The method according to the present invention makes no changes to the data contained in these columns 22,23,24,25, since it only modifies the value of the alphanumeric labels 26,27,28,29 in the first column 21 in order to determine the groups and the sorting orders that the user wants to create. Each row of the program table can thus be moved by means of re-sorting operations, but it will remain unchanged except for the value of the alphanumeric label 26,27,28,29, which can be modified in accordance with the method of the present invention.

The second column 22 of the program table 20 contains the program names. For simplicity, they are represented by characters "n." followed by a capital letter, but it will be apparent to a man skilled in the art that they may take any form.

Likewise, other parameters are represented in a simplified way as well, such as the PID ("Packet IDentifier") of the numeric channels (column 24) and the radio frequency at which the program is received (column 25). The program numbers in column 23, assigned by the television apparatus during the tuning process, are represented as usual by natural numbers.

It will be apparent to the man skilled in the art that a program table may contain many other columns representing other characteristics of the programs received by the television apparatus, such as, for example, the quality of reception, the transmission power at which the radio repeater is emitting the signal that carries the program, the geographic coordinates, or the place where the television repeater is located, and many other data. The table 20 of FIG. 2 must therefore be considered as a much simplified and non-limiting example showing one possible configuration of a program table.

The descriptive example illustrated with reference to the table 20 assumes that said table 20 has been sorted by increasing values of the alphanumeric labels 26,27,28,29 listed in the first column 21. It must however be underlined that the sorting of the programs shown in the table 20 is only an explanatory example.

Note in particular that in the program table 20 the alphanumeric label values a5, a6, a13 and a19 are not associated with any program, and therefore they correspond to positions in the program table 20 which are available for radio-television programs. In this description, the term "available position" refers to a program position corresponding to an alphanumeric label value not associated with any program, but belonging to the set of assignable alphanumeric label values. An assignable set of alphanumeric label values may consist, for example, of values having a common alphanumeric part (letter "a" in the example of FIG. 2) and a specific numeric part, e.g., included in the range of natural numbers between zero and one thousand, extremes excluded. It will be apparent to the man skilled in the art that an infinite variety of sets of values may be assigned to alphanumeric labels. For simplicity, in the following description only those available positions will be taken into account which have a label value smaller than the maximum of the label values actually associated with the programs in the program table; this will not mean, however, that the positions corresponding to label values greater than said maximum, up to the upper limit of the assignable set, cannot be occupied.

The program table in the example of FIG. 2 can be stored in memory means included in the television apparatus, which can display its data, at least partially, in lists that will be described below. Visualization may occur on a screen included in the apparatus itself or connected thereto through any connection means known to those skilled in the art, such as, for example, a physical wired connection or a wireless connection.

The following will describe a first embodiment of the present invention through an example of re-numbering of the programs in the table 20 of FIG. 2. In this example it is assumed that the user wants to move a first program, i.e., the one called "n.D" in the table 20 of FIG. 2, associated with a first alphanumeric label 26 with value a11, so that, in the table 20 sorted by increasing alphanumeric label values, it will occupy the position currently occupied by a second program, which in this example is the one that in the table 20 of FIG. 2 is named "n.B" and is associated with a second alphanumeric label 27 with value a8.

Figure 3:
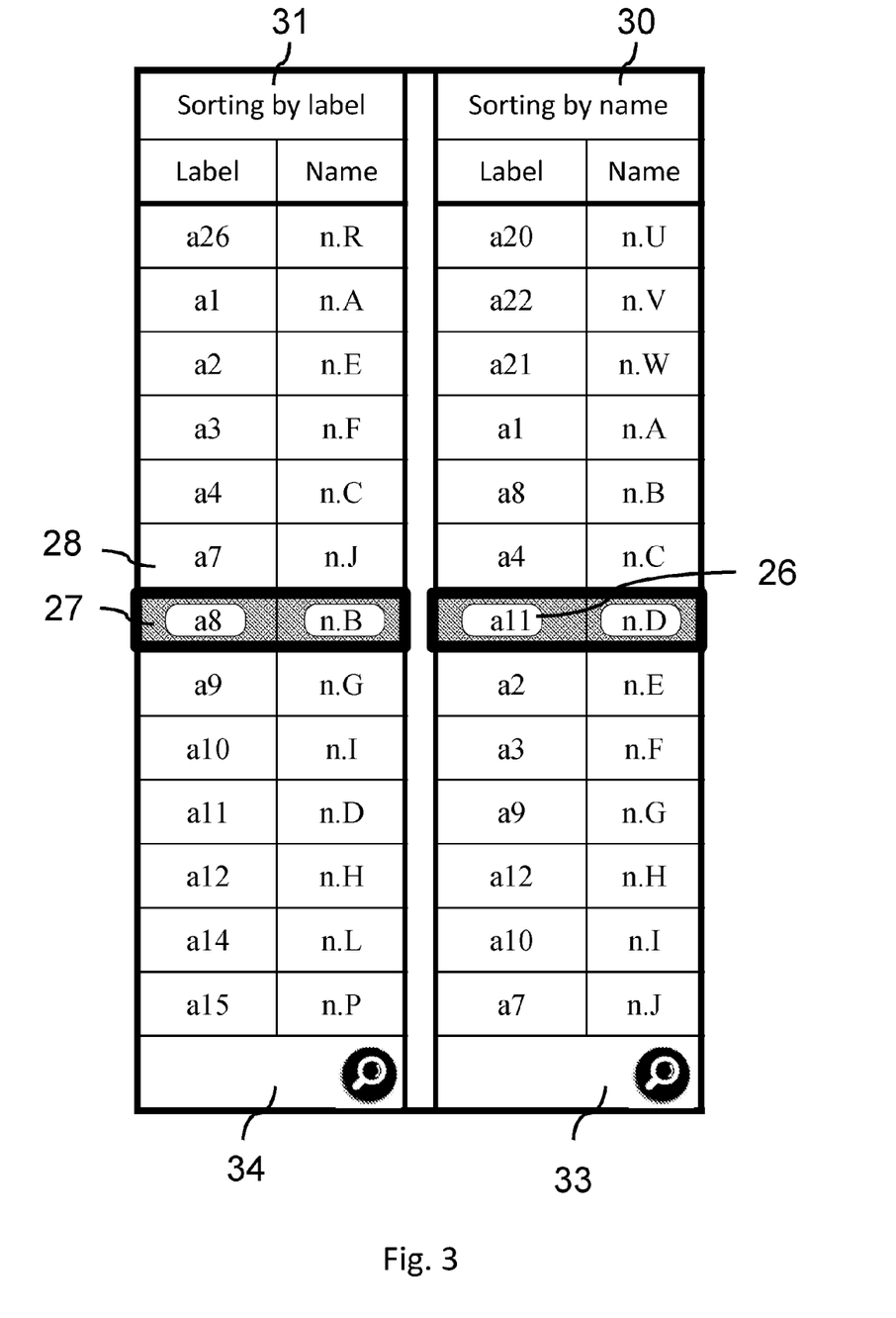
FIG. 3 shows an example of a screen for sorting, or re-numbering, programs in accordance with the present invention.

With reference to FIG. 3, after the user has issued the command for activating the re-numbering mode, the method of the present invention provides for displaying on a screen two opposite lists of data extracted from the table 20. A first list 30 highlights at its center the name "n.D" of said first program, next to its first alphanumeric label 26 with value a11. In order to facilitate the search for this program, said first list 30 is sorted according to a first sorting criterion suitable for this purpose. In the example taken into account, this sorting is alphabetic by increasing program names.

A second list 31, also comprising data extracted from the table 20, highlights said second alphanumeric label 27 with value a8, associated with the program named "n.B", which is to be replaced by the first program named "n.D". In order to facilitate the search for the alphanumeric label with value a8, this second list is sorted according to a second sorting criterion, which in this example is the sorting by increasing alphanumeric label values.

The following will extensively describe how said first program "n.D" and said label 27 with value a8 can be found and moved to the positions highlighted in FIG. 3. Assuming now that the arrangement shown in FIG. 3 has been obtained, it will now be illustrated how the first label 26 associated with the first program named "n.D" can be modified so that, in the sorting based on the second sorting criterion, the program "n.D" will occupy the position currently occupied by the second program named "n.B", associated with the second label 27 with value a8.

A first mode of modifying the label associated with said first program "n.D" consists of exchanging the first label 26 with the second label 27.

Figure 4:
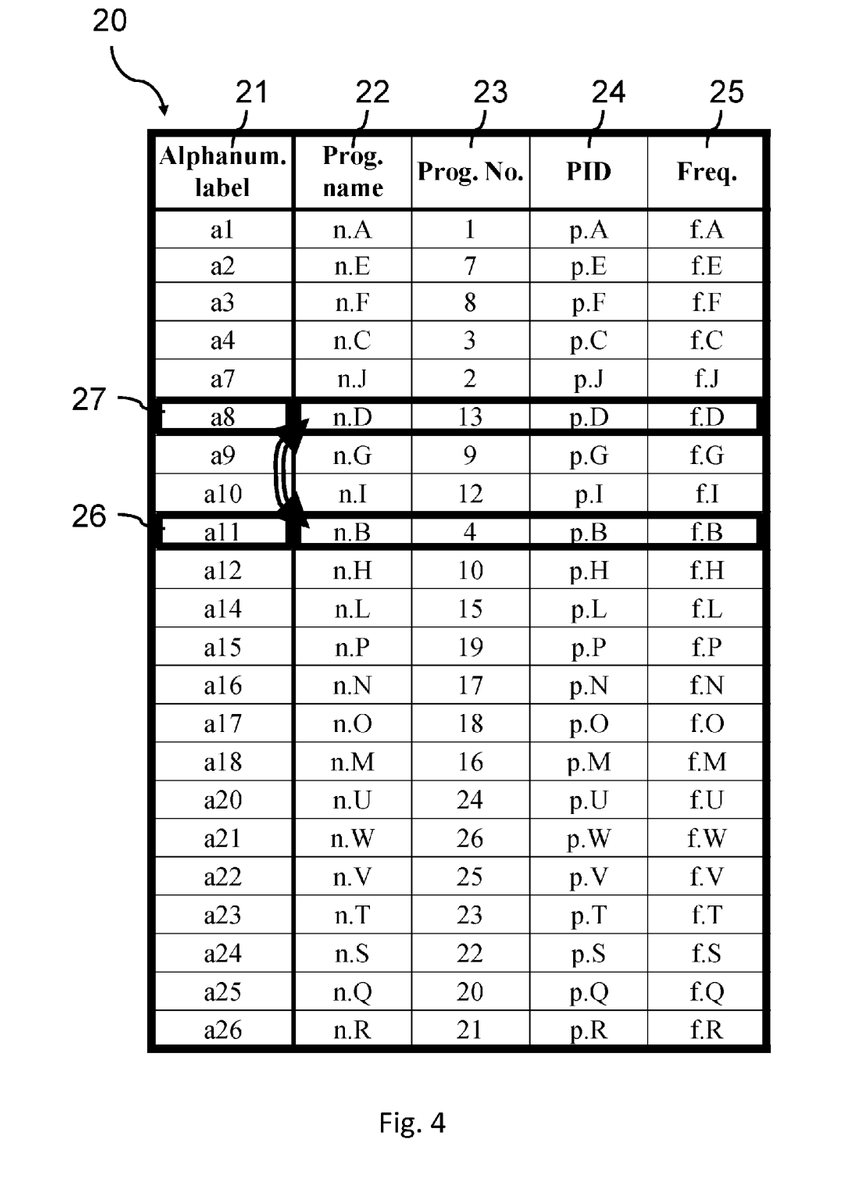
FIG. 4 shows a re-numbering example in accordance with a first variant of a first embodiment of the present invention.

The result of this exchange is shown in FIG. 4. Comparing the program table 20 of FIG. 4 with the program table 20 of FIG. 2, it can be seen that the column of the alphanumeric labels has not changed, whereas in the program table 20 of FIG. 4 the channels named "n.D" and "n.B" have exchanged their positions, along with their respective data.

Note that in this case only the values of those alphanumeric labels through which the user recalls the first program and the second program have changed.

A second mode of associating the first program with the second alphanumeric label 27 with value a8 is, with reference to the program table 20 of FIG. 2, to increment the value of the numeric part of the second alphanumeric label 27 of the second program and of those in the lower rows, and to associate with the first program the label value that the second program had prior to the increment. This mode may offer two alternatives.

The first alternative consists of applying said increments with no exceptions, under the hypothesis that they will originate values belonging to the set of assignable alphanumeric label values.

Figure 5:
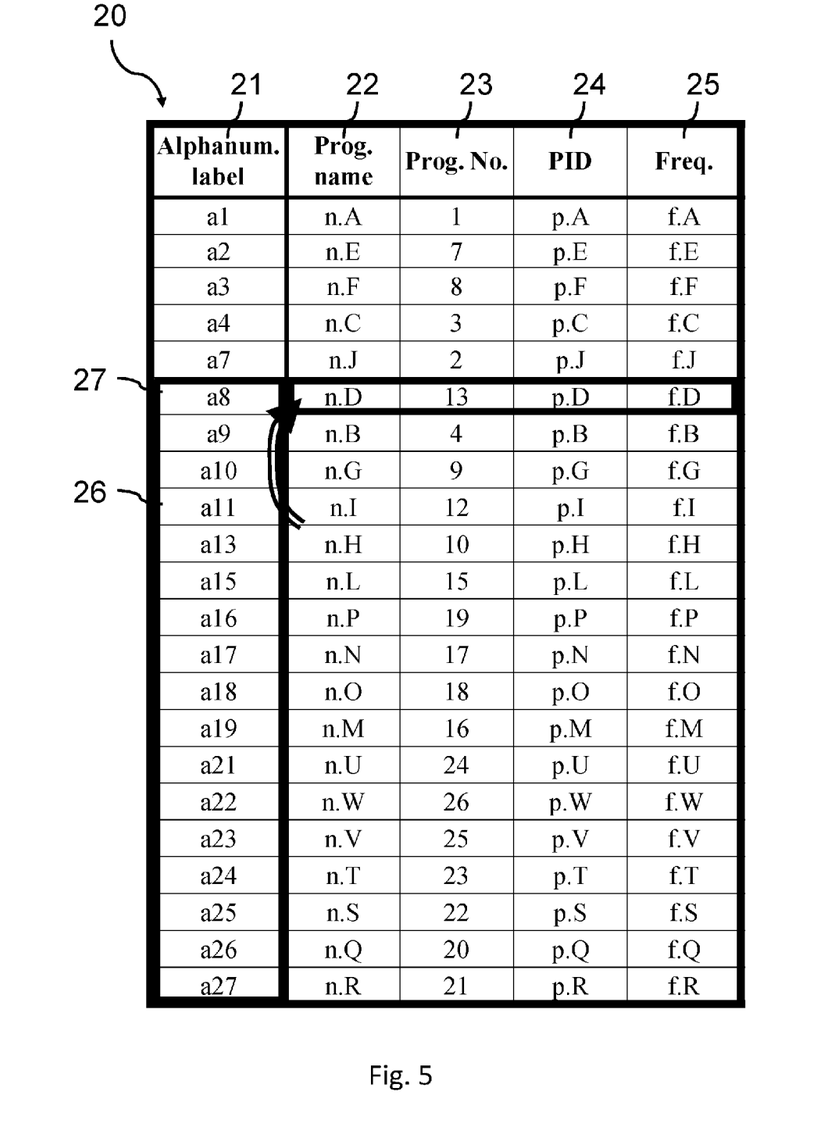
FIG. 5 shows a first re-numbering alternative in accordance with a second variant of a first embodiment of the present invention.

With reference to FIG. 5, there is shown the result of this operation after the program table 20 has been re-sorted by increasing label values: the first program, named "n.D", turns out to be associated with the alphanumeric label 27 with value a8, while the numeric part of the label values associated with the programs occupying positions following the one of the label 27 have been incremented by one unit from the values that they had prior to the modification. The positions that were available prior to the re-numbering operation (FIG. 2), i.e., those corresponding to the label values a5, a6, a13 and a19, after the re-numbering (FIG. 5) correspond to the label values a5, a6, a14 e a20. To these available positions another one has been added, corresponding to the label value a12, which has become available after the association of said first program "n.D" with the label 27 with value a8. Note that, in view of the following description, among the above-mentioned label values corresponding to available positions, the smallest one of those which are greater than the value associated with said second program "n.B" is a12.

Following this re-numbering operation, the alphanumeric labels through which the user will recall all programs, from the second program downwards, including the first program, have changed.

This first alternative is not applicable when the maximum of the values of the alphanumeric labels associated with the channels coincides with the upper limit of the set of assignable values.

The second alternative consists of applying increments as in the first alternative, but only until, while orderly proceeding by increasing values from the second label 27 with value a8, the increment generates a value not associated with any channel, i.e., a label value corresponding to an "available position". As aforementioned, the label value that meets this criterion is a12.

Figure 6:
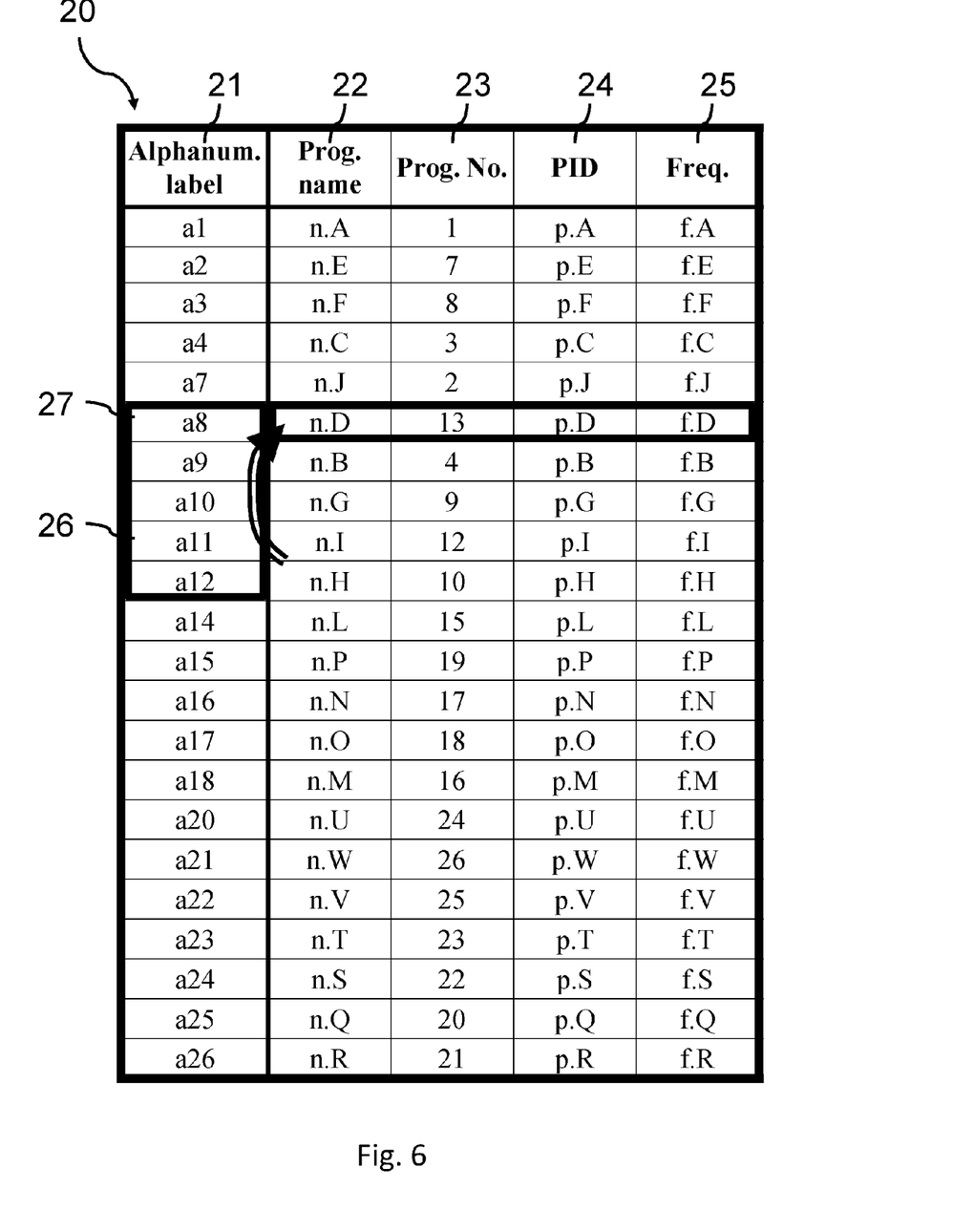
FIG. 6 shows a second re-numbering alternative of a variant of a first embodiment of the present invention.

With reference to FIG. 6, there is shown the result of the application of this second alternative, highlighting that only the values of the alphanumeric labels from the second alphanumeric label 27 with value a8 to the label with value a12 included have changed.

This second alternative is not applicable when the maximum of the values of the alphanumeric labels associated with the channels coincides with the upper limit of the set of assignable values and there are no available positions with label values greater than that of said second label 27.

In a second embodiment of the present invention, it is imposed that the first program associated with the first alphanumeric label 26 with value a11 takes a position between that of said second program associated with the second alphanumeric label 27 with value a8 and the program that occupies the position immediately preceding said second program, which in the example of FIG. 2 is named "n.J" and is associated with a third alphanumeric label 28 with value a7, under the condition that the number of association changes between alphanumeric labels and programs must be minimized. Since in this case the first program must not necessarily be located in the place of the second program, three possible modes of changing the label associated with the first program "n.D" can be considered, choosing the one that will imply the smallest number of association changes between alphanumeric labels and programs.

The first mode is the same as the first mode described in the first embodiment, i.e., exchanging positions between said first and second programs. This first mode requires changing two label-program associations, as highlighted in FIG. 4.

The second mode is the same as the second mode described in the first embodiment, i.e., locating said first program in the place of said second program, and re-numbering said second program and the subsequent programs as described in the second alternative of the first embodiment. This second alternative, in any case, implies a number of label-program association changes which is smaller than or at most equal to that of the first alternative, and therefore said first alternative may not be taken into consideration in this second embodiment.

The third mode is specular to said second mode.

Again with reference to the example of FIG. 2, it consists of placing the first program named "n.D", associated with the first label 26 with value a11, in a position immediately preceding the position of the second program named "n.B", associated with the second label 27 with value a8, by assigning to the numeric part of the alphanumeric label of said first program the value, decremented by one unit, of the numeric part of the label of said second program and by decrementing by one unit the value of the numeric parts of the preceding alphanumeric labels until, while orderly proceeding by decreasing values of said numeric part, the decrement generates a value not associated with any channel, i.e., a label value corresponding to an "available position". This third re-numbering mode can only be applied if there are any label values smaller than the one of said second label 27 which correspond to "available" positions.

In the example of FIG. 2 there are some available positions above the label 28 with value a7, and therefore the label 28 decrements its own value from value a7 to value a6, remaining associated with the program named "n.J", while the other labels remain unchanged.

Figure 7:
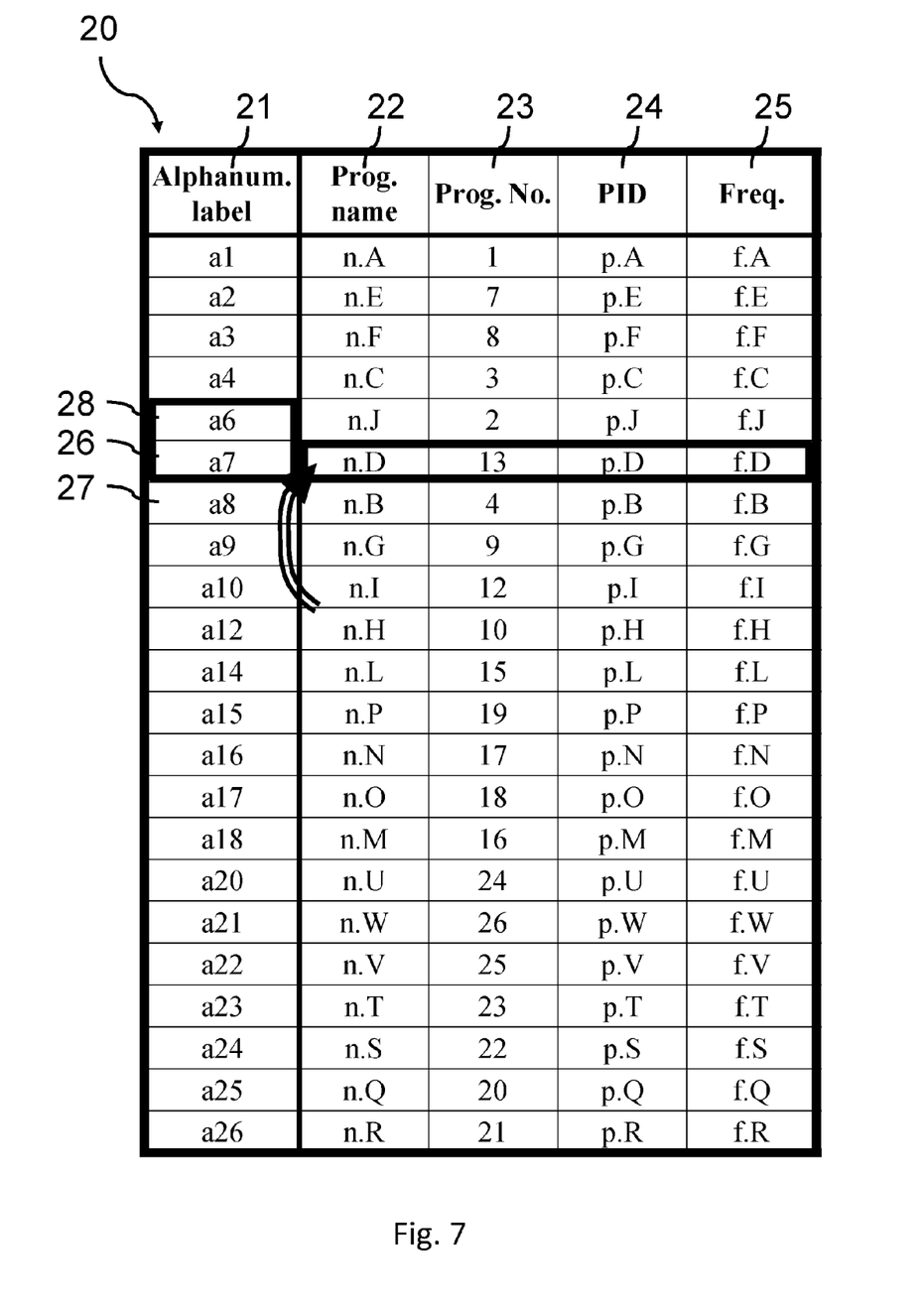
FIG. 7 shows a re-numbering example in accordance with a second embodiment of the present invention.

With reference to FIG. 7, there is shown the result of this re-numbering operation; as can be seen, the first alphanumeric label 26 has taken the value a7 and the third alphanumeric label 28 has taken the value a6, while all the other labels have remained unchanged.

In the example of the second embodiment described above, the number of association changes between alphanumeric labels and programs is two in both the first (FIG. 4) and third (FIG. 7) re-numbering modes, whereas the second re-numbering mode requires five changes. As regards the number of label-program association changes, the first and third modes are equivalent and preferable. Of these two, the third mode appears to be preferable because no other changes occur in the relative positions of the programs apart from the change of the order position of said first program (FIG. 7), while in the first mode also said second program will change its own position relative to the other programs (FIG. 4).

With reference to FIG. 2, a second example of application of the present invention in said second embodiment will now be illustrated. In this second example, it is assumed that the programs in the program table 20 need to be re-numbered in such a way that said first program "n.D" associated with the first alphanumeric label 26 with value a11 will take a position between that of the program "n.J" associated with the label 28 with value a7 and that of the program associated with the label that precedes said label 28 in the program table 20, i.e., the program "n.C" associated with the label 29 with value a4.

In order to find the alternative that minimizes the number of association changes between alphanumeric labels and programs, as is assumed in the second embodiment of the invention, the third re-numbering mode will first be examined.

It has already been remarked that above the alphanumeric label 28 and under the label 29 there are two available positions corresponding to the label values a5 and a6. According to the criteria of the second embodiment, it is possible to assign to said first program "n.D" the label value a6 without altering any other data of the program table 20, i.e., by just changing the label-program association for said first program "n.D". It can then be easily verified that the other re-numbering methods would require a greater number of changes.

Figure 8:
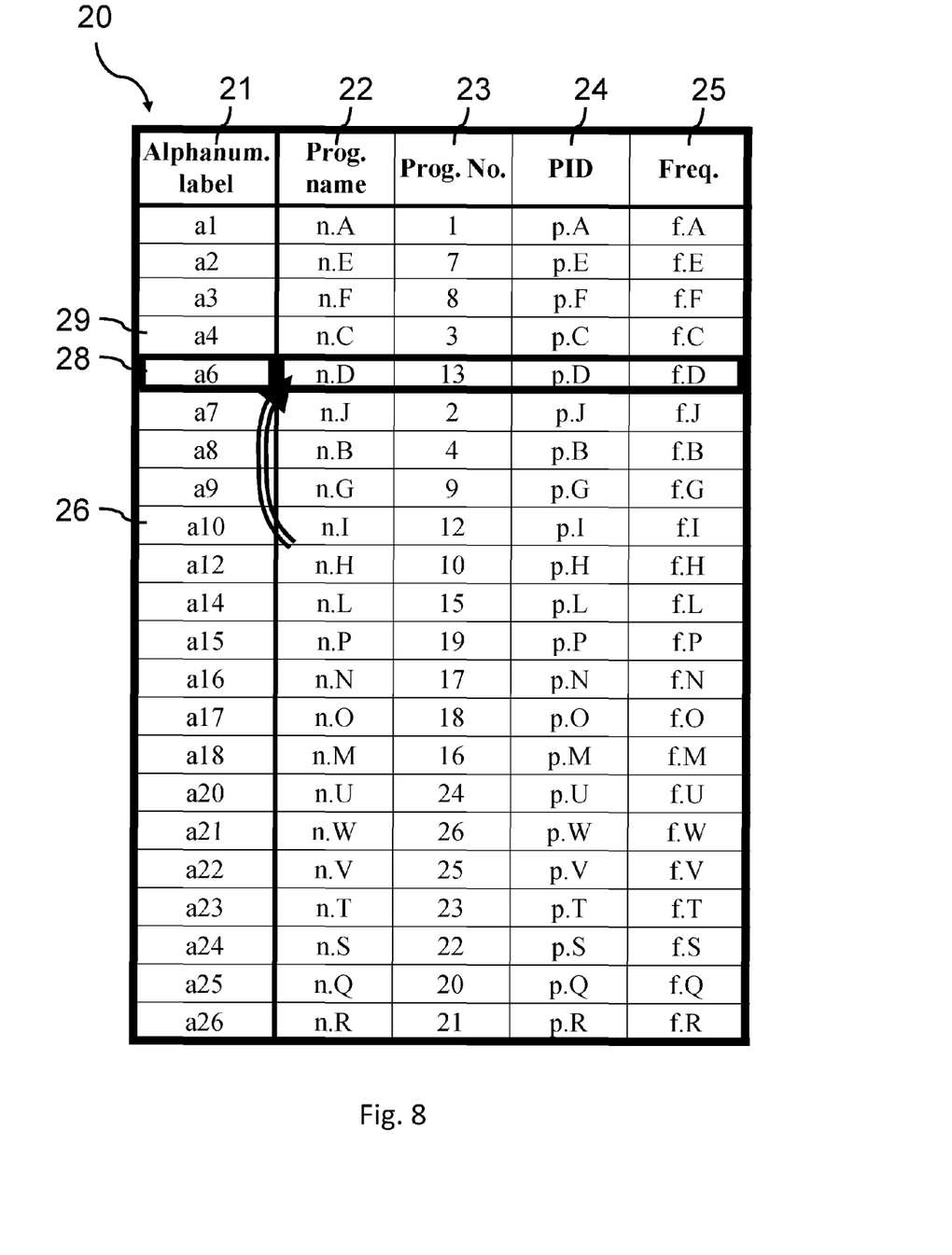
FIG. 8 shows a further re-numbering example in accordance with the present invention.

The result of the application of the method of the second embodiment will be in this case as shown in FIG. 8, which highlights the single label-program association change caused by the re-numbering operation.

One variant of the above-described embodiments relates to the case wherein the available position where the first program is to be moved, found in accordance with the above-described criteria, belongs to a group of contiguous available positions, as is the case of the labels with values a5 and a6 in the example of FIG. 2. In such a case, instead of establishing beforehand that the target position is the first one that meets the re-numbering criterion, preference may be given to one of such positions, which may be the first one, the last one, or a different one identified in accordance with a given criterion.

To make this description clearer, examples of application have been proposed so far wherein, except for the numeric part, the alphanumeric labels 26,27,28,29 have the same value, i.e., the same value of the alphabetical part (character "a" in the examples). In general, however, the alphanumeric labels 26,27,28,29 may have diversely composed strings of characters, based on which the radio-television programs can be divided into groups. For example, there may be a group of programs broadcast by satellite, marked with the letter "S", a group of programs broadcast by terrestrial networks, marked with the letter "T", a group of programs included in a subscription, marked with the letter "A", a group of pay programs, marked with the letter "P", and more. As an alternative, one may define a group of programs broadcast via satellite and included in a subscription, marked with the pair of letters "SA", and a group of pay programs broadcast via satellite, marked by the pair of letters "SP". In this case, the operations for re-numbering the numeric part, described in the various embodiments and variant thereof, are preferably only applied to those alphanumeric labels having the same alphabetical part, as if the programs associated with alphanumeric labels with the same alphabetical part had been collected into a separate table, similar to the program table, independently of other programs.

Again with reference to FIG. 3, it must be pointed out that, in the application examples made herein, the method of the present invention can be applied even if only the alphanumeric labels and the program names are displayed in the list. As a matter of fact, if the user is only interested in placing the first program, the name of which or a part thereof is known, into a certain position relative to the other programs, the first list 30 may even contain just the program names. On the other hand, the user may want to see also other characteristics of the programs involved in the re-numbering process; for this reason, in general, the number of lists 30,31, the number of columns in each list, the types of data contained in the columns, and the type of sorting order may vary. For example, the screen may include a list wherein the radio-television programs are sorted by content type, or according to the presence or absence of encryption, or according to the broadcasting network, or according to other criteria. In general, the sorting can be made on the basis of the values of any column in the program table and of combinations of such values. For example, if the alphanumeric label (column 21 in table 20) allows distinguishing the programs included in a user's subscription from the programs requiring an additional payment in a list like those shown FIG. 3, this differentiation can be combined with the alphabetical sorting by name (column 22 in table 20) to obtain a list 30 (FIG. 3) showing, in alphabetical order, first those programs not requiring any payment, and then, also in alphabetical order, the pay programs.

It will be apparent to the man skilled in the art that, without departing from the present invention, many combinations of criteria can be composed. Furthermore, the presentation of the program data can be enriched by using more than two lists, diversely sorted and containing different data columns, which lists may be arranged in different orders, e.g., by placing the list 30 (FIG. 3) on the left, instead of on the right, of the list 31.

Therefore, the embodiments illustrated in this description should not be understood to be binding as concerns the number of lists 20,22 shown on the screen, the number of columns contained in each list, and the criteria employed for sorting said lists 30, 31.

In particular, the sorting criteria may be set beforehand by the manufacturer of the television apparatus or by the user while installing the apparatus, or the apparatus may be equipped with setting means allowing the user to modify the sorting criteria at any time.

When a list is displayed on the screen, the user is generally interested in searching it, in the simplest way, for a program that meets a certain criterion. For example, the user may want to find a program of which he/she knows the name or an initial part thereof or a particular string of characters contained in the name. Also, the user may want to find a program of which he/she knows, whether fully or partially, the alphanumeric label attributed to it or the program number, or something else.

The search mode in each list may be made by browsing the list by means of row or page browsing commands, or by entering into a search field a sequence of characters to be searched for in the various ways known to those skilled in the art.

Up and down browsing can be obtained by using the normal keys available on television sets and on their remote controls. For executing actions on the various lists, different keys may be dedicated to browsing different lists (e.g., keys 1, 4, 7 and the key normally located under 7 for browsing up or down the second list 31 one row or one page at a time, and, likewise, keys 3, 6, 9 and the one normally located under 9 for browsing the first list 30), or the same browsing keys may be used for all or some lists, using one or more keys for selecting the list to be browsed by means of the common keys. As an alternative, one may use the arrow keys usually dedicated to the user's interaction with pages of the interactive menu for controlling the television apparatus.

For entering sequences of characters to be searched for, FIG. 3 shows by way of example a first search field 33 where sequences can be set for searching for program names in the first list 30. The search made by means of the first search field 33 is dynamic according to the first sorting criteria. In the present description, the term "dynamic" means that whenever the list sorting criterion changes, the search will be adapted to the sorting criterion. For example, if a list is sorted alphabetically (from letter A to Z, or from Z to A) by program names, the search process will search, in the list of radio-television programs receivable by the television apparatus, for the program name or part thereof entered by a user, possibly comprising metacharacters ("wildcard" characters); likewise, if the list is sorted alphanumerically, the search process will search for the sequence of alphanumeric characters entered by the user; if the list is sorted according to the contents of the programs, the search process will search for programs having the contents entered by the user. In this latter case, it is assumed that a genre has been associated with the receivable programs stored in the memory means of the television apparatus, as in the program search functions of television program guides known in the art.

The program in the program table 20 that meets the search criterion is highlighted and moved near the center of the column of the list. The list is preferably cyclic, so that, if it contains a number of rows smaller than that in the program table, as in the example of FIG. 3, the program found can still be moved to the same vertical position at the center of the list) and the list can still be browsed in both directions, as if the program table 20 had been printed on a wheel. In fact, by comparing the list 31 (FIG. 3) with the first two columns of the program table 20 (FIG. 2), it can be noticed that the first row of the list 31 reproduces data of the last row of the table 20. Likewise, it can be observed that the first three rows of the list 30 (FIG. 3) reproduce data of the last three programs in increasing alphabetical order of their names.

It may be initially advantageous to set the values of the alphanumeric labels by using, as their numeric part, the program numbers (column 23 of the program table 20), which are biunivocally associated with the radio-television programs of the television apparatus during the tuning process. Such program numbers are normally derived from the LCNs, while any conflicts between different programs to which the same LCN value has been attributed can be solved either automatically or manually by the user. The biunivocity characteristic of the association of alphanumeric labels, such as the one with program numbers, must be referred to the full program data, not just, for example, to the program names. In practice, in fact, there are cases wherein programs have the same name, but differ in other characteristics (e.g., the radio frequency at which they are received, the quality of reception, or the like). In such cases, the program numbers and the alphanumeric label values will be different, even though the program names are the same.

The above-described embodiments, and the variants thereof, are neither exhaustive nor limiting of the different criteria applicable for the assignment of an available position to said first program. The man skilled in the art will be able, in fact, to define further embodiments and variants, especially when the available positions are numerous.

For example, in the first re-numbering mode of the first and second embodiments, said second program may, instead of replacing said first program, take a position in the program table 20 according to various alternatives, through an appropriate assignment of an alphanumeric label value. With reference to the program table 20 sorted by increasing alphanumeric label values, such position alternative include:
a) the first available position, wherever it is;
b) the first available position following the position currently occupied by said second program;
c) the position that follows the last occupied position;
d) the first available position which is found while going backwards from the last allowable position for a program, i.e., from the position corresponding to the maximum value that can be attributed to an alphanumeric label.

The above-listed alternatives are to be understood as mere examples of assignment of the value of the second alphanumeric label 27. The man skilled in the art will in fact be able to define further alternatives.

All of the embodiments and variants described herein observe the criterion of assigning to the first program a position that immediately precedes the position of the second program, or the very position of the second program.

When the user communicates to the apparatus that he/she wants to stop the program sorting operations, e.g., by pressing a key for exiting that mode, the apparatus will ask if the user wants to save the changes made to the program table 20, so that the alphanumeric labels resulting from the operations just carried out will be those that the user will have to use in order to recall and watch the radio-television programs associated therewith.

In all of the embodiments and variants thereof described herein, the operations for modifying the numbering of radio-television programs are facilitated by the simultaneous use of at least a first list 30 and a second list 31, as previously described, which allow the user to see the context of the data (programs and associated alphanumeric labels) to be taken into consideration, both near the position or row occupied by the program to be re-positioned and near the position where said program must be re-positioned.

Preferably, the first list 30 and the second list 31 are cyclic in order to allow the user to browse the radio-television programs included therein. In general, in fact, it is possible to simultaneously display on the screen only a limited number of the programs included in the program table of the television apparatus (the program table 20 may contain many tens or hundreds of television programs). The first list 30 and the second list 31 of the present invention advantageously allow simultaneous visualization of a limited number of programs even when they are located in areas of the program table far from each other, and allow simultaneous highlighting of programs located in distant relative positions within the program table. With these visualization and highlighting means, the user can browse all programs receivable by the television apparatus. For example, the user may use the "Up" and "Down" keys of a remote control of the television apparatus for browsing the first list 20 or the second list 22, for displaying programs allocated to previous or subsequent positions in the list, and for selecting the desired program.

In particular, every time the "Up" and "Down" keys are pressed, the highlighting means remain in a fixed vertical position, near the center of the first list 30 and of the second list 31 (approximately at the center of the screen), while the programs displayed in the list are browsed cyclically relative thereto.

This feature offers the advantage that visualization is focused on those programs which are principally involved in the re-numbering process, showing what is around them in different sorting conditions, and allows changing the numbering easily and quickly. The first search field 33 and the second search field 34 make the search for desired programs considerably easier when the number of receivable programs is large (digital terrestrial television includes approx. 300-500 radio-television programs).

This method may advantageously find many applications, particularly for managing and modifying lists of radio-television programs automatically or manually tuned by television apparatuses.

The method according to the invention can be implemented by means of a computer program product which can be loaded into a memory of said television apparatus and which comprises software code portions adapted to implement said method.

Figure 9:
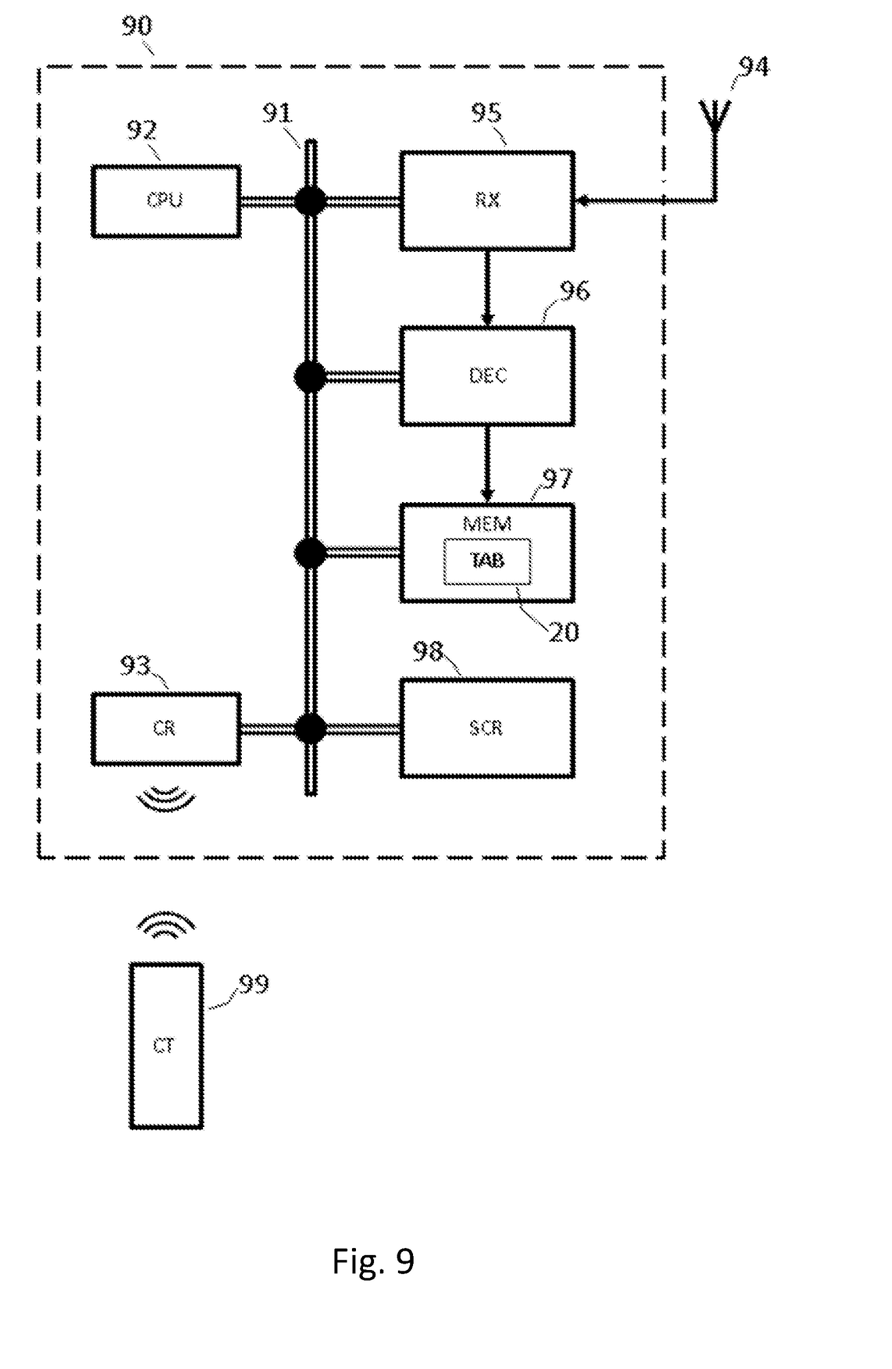
FIG. 9 shows a diagram of an apparatus configured for implementing the method according to the present invention.

With reference to FIG. 9, the following will illustrate in a simplified manner one example of an apparatus 90 implementing the method of the invention.

A first element 91 represents a connection "bus" between the elements that concur in the implementation of the method. A second element 92 (CPU) controls the set of elements and provides for executing the steps of the method of the invention.

Further elements 93-99 constitute the means available to the user for issuing commands towards the apparatus. They are represented as a remote control 99 and a receiver 93 for receiving the signals emitted by the remote control 99. For simplicity, no other means are shown (e.g., keypads and keys), which the man skilled in the art will be able to add to the apparatuses in order to allow entering commands directly on the apparatuses themselves.

A third element 95 represents the receiver through which the apparatus receives the signals carrying the radio-television programs picked up by an antenna 94.

A fourth element 96 executes all the decoding operations required for extracting from the received signals the data to be entered into the program table 20, which is contained in a memory 97. For this purpose, a direct connection is shown between the decoder 96 and the memory 97.

Finally, display means 98 are shown, under the assumption that they are integrated into the apparatus. For some types of apparatuses (e.g., decoder of signals broadcast via satellite), the display means 98 may be external and connected to the apparatus 90 through physical wired connections or wireless connections known to those skilled in the art.

The features of the present invention, as well as the advantages thereof, are apparent from the above description.

A first advantage of the method and apparatus for re-determining the numbering of radio-television programs is that they allow a user to set the program numbering in an easy and simple manner.

A second advantage of the method and apparatus according to the present invention is that a user is allowed to simultaneously display the program list according to a plurality of sorting criteria; this facilitates the search for a certain radio-television program in the table, to be moved or re-sorted, of which the user does not know or remember the value of a sorting criterion (e.g.: the LCN or the program number), while he/she perfectly knows the value of another one (e.g.: the program name), since this latter criterion is easier to remember.

A third advantage of the method and apparatus according to the present invention is that they allow a user to display the context of the data (program numbers, program name, etc.) both near the position occupied by the program to be modified and near the position where the program must be placed, i.e., the assignment position.

The method and apparatus for re-determining the numbering of radio-television programs according to the present invention may be subject to many possible variations without departing from the novelty spirit of the inventive idea; it is also clear that in the practical implementation of the invention the illustrated details may take different forms, and that the elements that are characteristic of the method may be replaced with other technically equivalent elements.

It can therefore be easily understood that the present invention is not limited to a method and an apparatus for re-determining the numbering of radio-television programs as described in the present invention, but may be subject to many modifications, improvements or replacements of equivalent parts and elements without departing from the inventive idea, as clearly specified in the following claims.

The invention claimed is:

1. A method for re-determining, in a television apparatus, a program table comprising associations between alphanumeric labels and radio-television programs, each one of said alphanumeric labels indicating a string of characters that must be selected by a user in order to activate a reproduction of one of said radio-television programs associated therewith, said method comprising the steps of:

biunivocally associating, with each radio-television program in said table, an alphanumeric label comprising a numeric part;

allowing at least a first list and a second list to be simultaneously displayed on a screen, both comprising identification data of said radio-television programs obtained from said table, said radio-television programs being sorted in said first list and said second list according to sorting criteria;

selecting a first program from said first list of programs sorted according to a first sorting criterion, said first program being associated with a first alphanumeric label;

selecting a second program from said second list of programs sorted according to a second sorting criterion, said second program being associated with a second alphanumeric label;

modifying a value of said first alphanumeric label of said first program with an alphanumeric label value comprised in a range delimited by a value of said second alphanumeric label, extreme included, and by the value of that alphanumeric label, extreme excluded, which immediately precedes said second alphanumeric label in said second list.

2. A method according to claim 1, wherein at least one of said first list and said second list of radio-television programs is sorted according to the values taken by said alphanumeric label.

3. A method according to claim 1, wherein said first alphanumeric label of said first program is exchanged with said second alphanumeric label of said second program.

4. A method according to claim 1, wherein the value of said first alphanumeric label is modified with an alphanumeric label value not associated with any radio-television program.

5. A method according to claim 1, wherein said first alphanumeric label of said first program is replaced with said second alphanumeric label of said second program, and wherein said method provides for incrementing by one unit the value of the numeric part of said second alphanumeric label and the value of the numeric part of the labels subsequent thereto according to the order of said numeric part.

6. A method according to claim 5, wherein the values of the numeric parts of said alphanumeric labels subsequent to said second alphanumeric label are incremented by one unit up to a value at which the increment generates an alphanumeric label value which has not been assigned to any program, and said unassigned value belongs to a set of values that can be assigned to alphanumeric labels.

7. A method according to claim 1, wherein the numeric parts of the alphanumeric labels preceding said second alphanumeric label in the order of said numeric part are decremented by one unit down to the value at which the decrement generates an alphanumeric label value which has not been assigned to any program, and said unassigned value belongs to a set of values that can be assigned to alphanumeric labels.

8. A method according to claim 5, wherein said increment of the value of the numeric part of the alphanumeric labels is only applied to those labels which, without considering said numeric part, have the same value as said second alphanumeric label.

9. A method according to claim 1, wherein said re-determination of said program table is carried out by minimizing a number of changes to said associations between said alphanumeric labels and said radio-television programs.

10. A method according to claim 1, wherein one or more of said sorting criteria are set beforehand while manufacturing the radio-television apparatus, or are set by the user while installing the radio-television apparatus, or can be reset by the user through means for setting the sorting criteria of each one of said first list and said second list.

11. A method according to claim 1, wherein said first list and said second list are cyclic, for the purpose of allowing the user to browse, without solution of continuity, the radio-television programs contained therein, wherein the radio-television apparatus is configured to highlight the identification datum and the alphanumeric label of a program selected by the user.

12. A method according to claim 1, wherein said radio-television apparatus is configured to highlight said identification datum and said alphanumeric label positioned vertically near a center of the respective one of said first list and said second list.

13. A method according to claim 1, wherein said first list comprises a first search field in which the search is dynamic according to said first sorting criterion, and said second list comprises a second search field in which the search is dynamic according to said second sorting criterion.

14. A method according to claim 1, wherein, when tuning for the first time or re-tuning said radio-television programs, a program number is associated with each radio-television program, said program numbers being stored in said program table and the numeric parts of said alphanumeric labels being settable to the values of said program numbers stored in said program table.

15. A method according to claim 1, wherein the sorting criterion consists of values of data associated with said radio-television programs.

16. A method according to claim 1, wherein the data associated with said programs in said program table are obtained from at least one of the following sources:

signals transmitted by the radio-television broadcasting networks, comprising a program name, a Logical Channel Number, or LCN, and a transmission frequency;

information retrievable on the Internet, comprising a location of radio repeaters and transmission power values of radio repeaters;

assignments of a program number by the receiving apparatus.

17. A method according to claim 15, wherein said sorting criterion of a list of radio-television programs consists of the value of one or more data relating to said radio-television programs, including:
the program number of the radio-television program in said program table;
the name of the radio-television program;
the type of broadcasts in the radio-television program;
the type of radio-television program;
the broadcaster of the radio-television program;
the country where said broadcaster belongs;
one or more languages used in the broadcasts of the radio-television program;
the digital multiplex to which the radio-television program belongs;
the means of transmission through which the radio-television program is received;
the presence or absence of encryption, and possibly the type of encryption used for coding the signal carrying the radio-television program.

18. A method according to claim 1, wherein the values of the data that determine the sorting of the radio-television programs in a list are displayed in the respective list.

19. A radio-television apparatus comprising processing means, a first receiver configured to receive radio-television programs, a second receiver configured to receive commands issued by a user, a memory for storing a program table, said apparatus being adapted to generate the display of a graphic user interface on a display, and to implement the method according to claim 1.

20. A computer program product comprising a non-transitory computer readable medium comprising software code which can be loaded into a memory of said radio-television apparatus, wherein the software code, when executed by a processor, perform the method according to claim 1.

21. A method according to claim 7, wherein said decrement of the value of the numeric part of the alphanumeric labels is only applied to those labels which, without considering said numeric part, have the same value as said second alphanumeric label.

* * * * *